(12) United States Patent
Sassa et al.

(10) Patent No.: US 8,315,968 B2
(45) Date of Patent: Nov. 20, 2012

(54) MUSIC INFORMATION PROCESSING APPARATUS, MUSIC DELIVERING SYSTEM, AND MUSIC INFORMATION PROCESSING METHOD THAT CAN SATISFY A REQUEST FROM A USER

(75) Inventors: Akira Sassa, Saitama (JP); Katsu Saito, Saitama (JP); Makoto Akabane, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 550 days.

(21) Appl. No.: 12/551,036

(22) Filed: Aug. 31, 2009

(65) Prior Publication Data
US 2010/0063952 A1    Mar. 11, 2010

(30) Foreign Application Priority Data
Sep. 9, 2008   (JP) ................. 2008-230752

(51) Int. Cl.
*G06F 17/00* (2006.01)
*G06F 7/00* (2006.01)
(52) U.S. Cl. ......................................... 706/48; 707/705

(58) Field of Classification Search .................. None
See application file for complete search history.

(56) References Cited

U.S. PATENT DOCUMENTS
7,962,482 B2 *  6/2011  Handman et al. ............. 707/733
* cited by examiner

*Primary Examiner* — Alan Chen
(74) *Attorney, Agent, or Firm* — Finnegan Henderson Farabow Garrett & Dunner L.L.P.

(57) ABSTRACT

In a music information processing apparatus, a characteristic quantity acquiring unit reads out a music file from a music tune file storage unit and acquires a characteristic quantity of a music tune. A class value providing unit provides a class value for each music tune based on the characteristic quantity. The distribution acquiring unit forms a music tune assembly based on bibliography information read from the music tune file by a bibliography information acquiring unit, and acquires the distribution information of class values for each music tune assembly. The distribution information is stored into an analysis result storage unit, and an evaluation unit reads out distribution information based on user input, and evaluates the similarity between music tune assemblies or between a tune and a music tune assembly. An output unit recommends or reproduces a music tune assembly or a music tune according to the preference of a user.

16 Claims, 16 Drawing Sheets

FIG. 3

| CLASS VALUE | TEMPO VALUE | TONALITY | VOCALIST |
|---|---|---|---|
| 1 | ~80 | MAJOR KEY | MALE |
| 2 | | | FEMALE |
| 3 | | | MIXED CHORUS |
| 4 | | | NONE |
| 5 | | MINOR KEY | MALE |
| 6 | | | FEMALE |
| 7 | | | MIXED CHORUS |
| 8 | | | NONE |
| 9 | 80~120 | MAJOR KEY | MALE |
| 10 | | | FEMALE |
| 11 | | | MIXED CHORUS |
| 12 | | | NONE |
| ... | ... | ... | ... |
| 29 | 160~ | MINOR KEY | MALE |
| 30 | | | FEMALE |
| 31 | | | MIXED CHORUS |
| 32 | | | NONE |

MUSIC INFORMATION PROCESSING APPARATUS, MUSIC DELIVERING SYSTEM, AND MUSIC INFORMATION PROCESSING METHOD THAT CAN SATISFY A REQUEST FROM A USER

BACKGROUND OF THE INVENTION

1. Field of the Invention

The present invention generally relates to information processing technology, and more particularly, to a music information processing apparatus, a music delivering system that generates information on music, and a music information processing method applied thereto.

BACKGROUND TECHNOLOGY

2. Description of the Related Art

Recent developments in information processing technology, voice data compressing technology, or the like, make it possible to casually enjoy wide-ranging music via a variety of mediums, e.g., TV, radio, recording medium such as CD (Compact Disc) or the like, network distribution, or the like. A variety of information on music is abundantly provided via a network, or the like. For example, even with a tune inadvertently heard through a commercial message, or the like, it is possible to obtain information, such as the name of the tune, the name of the performer of the tune, the album that contains the tune, or the like, by searching via a search engine.

Generally, a system of information on music constitutes a tree structure, in which respective information is related in order of, e.g., an artist (singer), the name of an album, the name of the tune, or the like. The classification of each layer has variations. For example, the classification of a layer can be replaced by country of origin, musical era, composer, performer, solo/group, sales, or the like, or a layer can be added. However, in spite of these variations, the classification of each layer is organized almost in the same structure. A user commonly traces a tree structure even without knowing the structure of the tree. For example, a user traces a tree based on a tune, from the lower layer to the upper layer, to obtain information on an album or a performer or traces the tree to a lower layer to obtain the name of another album.

By inputting a concrete condition (e.g. a certain tune, a certain performer, or the like) in the system of information such as described above, information being related, directly or indirectly, to the input data can be obtained. On the other hand, it is not easy to obtain information using an ambiguous condition such as "a tune or a performer based on the preference of a user." As a result, a user generally follows a pattern in which he/she obtains information frequently by himself/herself and makes a choice from the obtained information by himself/herself so that he/she can finally find a tune or a performer of his/her preference.

A user may want to broaden the range of music he/she enjoys by starting a search from a set of core tunes that he/she now listens to. However, a situation may arise where the user cannot reach related information because it is not related in the tree or where too much information is relatively connected, making it difficult for the user to choose. Recently, it has become possible to search from one performer to another, based on the association of similar performers. However, this similarity often does not match the needs or actual situations of users, since this similarity is manually related based on subjectivity. Further, since all systems of information, such as the one described above, achieve their intended use by allowing a person to input information into a database, or the like, performers or tunes with little associated information are often omitted. Additionally, it is necessary to constantly update information in order to provide the latest information.

SUMMARY OF THE INVENTION

In this background, a purpose of the present invention is to provide a technology for generating information that flexibly supports the needs of music of users.

According to one embodiment of the present invention, a music information processing apparatus is provided. The music information processing apparatus comprising: a characteristic quantity acquiring unit operative to analyze a music tune and acquire a predetermined characteristic quantity, a bibliography information acquiring unit operative to acquire predetermined bibliography information of the music tune, a distribution acquiring unit operative to
(a) form a music tune assembly in a predetermined unit, based on the bibliography information, and (b) acquire distribution information of an evaluation value, unique to a music tune and determined by a predetermined rule based on the characteristic quantity, for each of the music tune assemblies as information unique to the music tune assembly.

The bibliographic information constituting tune assembly may be any unit to which a plurality of tunes can belong, such as, a music genre, a singer or performer, a composer, an album, or the like, and therefore, the variations thereof are not limited. The evaluation value is a scale that can be determined by a certain rule based on one or a plurality of characteristic values and that represents the characteristic values in a comprehensive manner. The evaluation value may be the characteristic value itself.

According to one embodiment of the present invention, a music distribution system is provided. The music distribution system including a server operative to distribute music to a user terminal manipulated by a user via a network, wherein the server comprises: a characteristic quantity acquiring unit operative to analyze a music tune and acquire a predetermined characteristic quantity, a bibliography information acquiring unit operative to acquire predetermined bibliography information of the music tune, a distribution acquiring unit operative to (a) form a music tune assembly in a predetermined unit, based on the bibliography information, and (b) acquire a distribution information of an evaluation value, the value being unique to a music tune and determined by a predetermined rule based on the characteristic quantity, for each of the music tune assemblies as information unique to the music tune assembly, an evaluation unit operative to detect, using the distribution information, a music tune assembly similar to a music tune assembly preferred by a user and specified through a user terminal, and an output unit operative to transmit a music tune data included in the detected music tune assembly to a user terminal via a network.

According to one embodiment of the present invention, a is provided. The method for allowing a processor to generate information on music comprising: reading out music tune data stored in a storage unit and acquiring a predetermined characteristic quantity by analyzing the music tune; reading out predetermined bibliography information of the music tune stored in a storage unit; forming a music tune assembly in a predetermined unit based on the bibliography information, and acquiring distribution information of an evaluation value, the value being unique to a music tune and determined by a predetermined rule based on the characteristic quantity for each of the music tune assemblies as information unique to the music tune assembly, and storing the information, accordingly.

Optional combinations of the aforementioned constituting elements and implementations of the invention in the form of methods, apparatuses, systems, computer programs, or recording mediums storing computer programs may also be practiced as additional modes of the present invention.

BRIEF DESCRIPTION OF THE DRAWINGS

FIG. 3 exemplifies information on the correspondence between combinations of values of characteristic quantity and class values that are held in a class value providing unit according to embodiment 1;

DETAILED DESCRIPTION OF THE INVENTION

Best Mode for Carrying Out the Invention

The invention will now be described by reference to the preferred embodiments. This does not intend to limit the scope of the present invention but to exemplify the invention.

Embodiment 1

Figure 1:
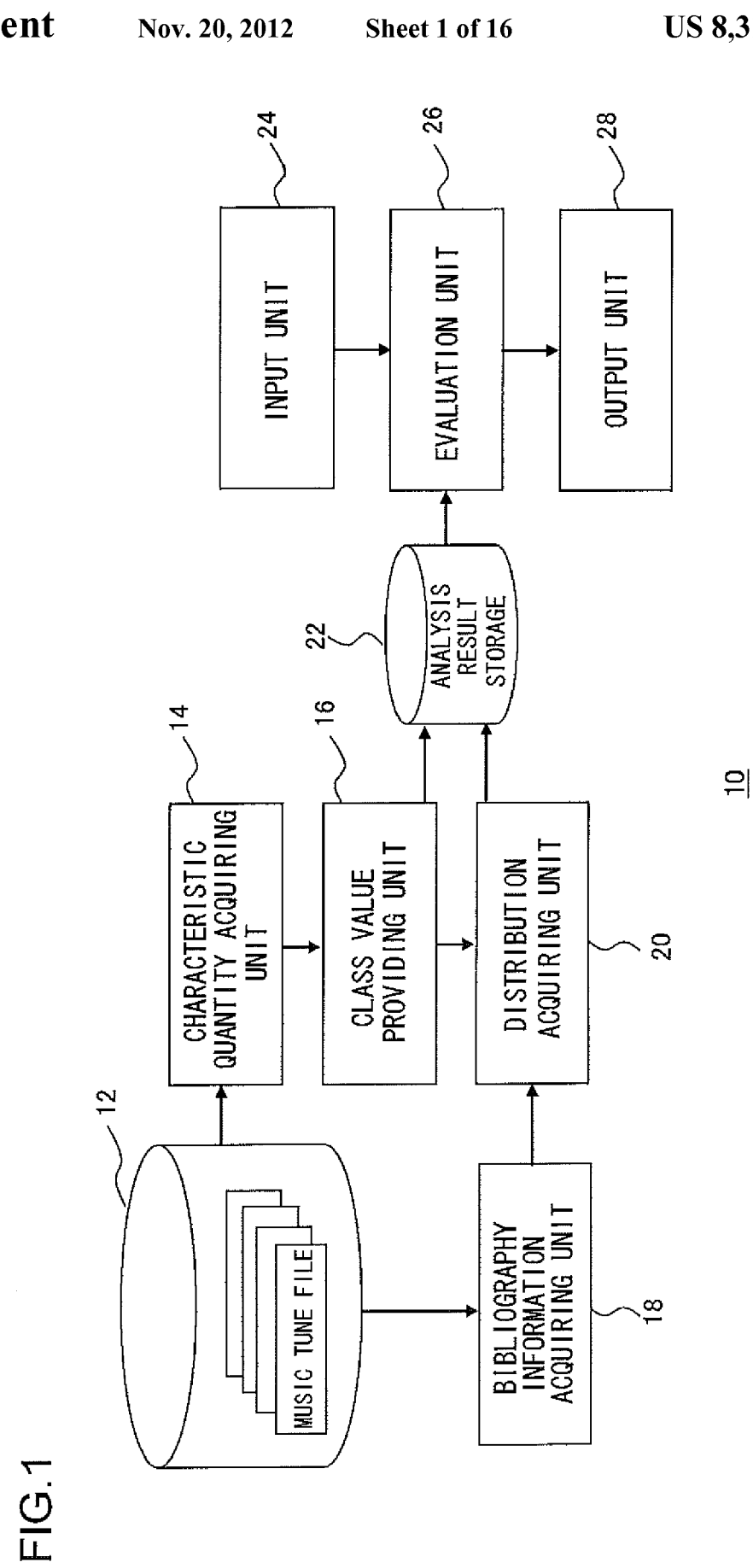
FIG. 1 shows a structure of a music information processing apparatus according to embodiment 1.

FIG. 1 shows a structure of a music information processing apparatus according to the present embodiment. The music information processing apparatus 10 includes a music tune file storage 12 that stores a plurality of tune files, a characteristic quantity acquiring unit 14 that acquires the characteristic quantity of a tune, a class value providing unit 16 that provide a class value for each tune based on the characteristic quantity, a bibliography information acquiring unit 18 that acquires a bibliographic information from a tune file, a distribution acquiring unit 20 that acquires the distribution information of class values for respective tune assembly determined by bibliographic information, and an analysis result storage 22 that stores the results of various types of analyses.

The blocks as shown in FIG. 1 may be implemented through hardware by elements such as CPU, memory, or other LSIs, and through software by a computer program, or the like. Therefore, it will be obvious to those skilled in the art that the functional blocks may be implemented in a variety of manners by a combination of hardware and software.

In the present embodiment, a concept of "the distribution of characteristic quantities" is introduced as new information on music. The "characteristic quantities" is one or combination of pieces of information indicating the characteristics of the tune, such as, the tempo of the tune, the tonality of the tune, whether there is a vocalist, the type of music instrument, quality of the sound, structure of the tune, magnitude of sound, pace of the beat, mood, proportion of energy of the rhythm instrument to the total energy, etc. The characteristic quantities are information considered unique to their respective tunes. In the present embodiment, information on the distribution of characteristic quantities is acquired for each certain unit of tune assembly grouped using bibliography information, i.e., a group of tunes included in the same album, a group of tunes sung by the same singer, or the like. Then, the similarity among albums or among singers is evaluated by comparing the distribution, and similar assemblies are associated with each other, accordingly. However, "the distribution of characteristic quantities" can be replaced by "the distribution of evaluation values determined using characteristic quantities," practically.

The music tune file storage 12 stores tune files that have tune data and bibliographic information attached thereon. The music tune file storage 12 may be a commonly-used storage device, such as, a hard disk, memory, or the like, and may be connected to other functional blocks via a network (not shown). The tune files stored in the music tune file storage 12 may be encoded using commonly-used method, such as MP3 (MPEG1 Audio Layer-3), or the like.

The characteristic quantity acquiring unit 14 reads music files from the music tune file storage 12 and acquires certain characteristic quantities by analyzing music data. Bibliographic information can be used in analyzing. Although either one or a plurality of characteristic quantities may be acquired, acquiring many characteristic quantities is preferable in order to perform a more accurate evaluation, which is performed later. The characteristic quantity acquiring unit 14 may acquire characteristic quantities for all tunes stored by the music tune file storage 12 prior to manipulation by a user.

Alternatively, the characteristic quantity acquiring unit 14 may acquire only the characteristic quantities for tunes specified by the user.

The class value providing unit 16 classifies the respective tunes according to the value of the characteristic quantities acquired by the characteristic quantity acquiring unit 14 and provides the class value, which is set beforehand, as the "evaluation value" described above. For example, in the case where only the distinction between major key and minor key is introduced as the characteristic quantity, two classes (i.e., a major key class and a minor key class) are set and class values, such as "1" and "2", are set to the classes, respectively. For example, the class value "1" is given to major key tunes, and the class value "2" is given to the minor key tunes.

In the case of introducing a plurality of characteristic quantities, class values are determined based on combinations of respective characteristic quantity values. Examples will be given later. Also, the class value providing unit 16 may provide class values for all tunes prior to manipulation by a user. Alternatively, the class value providing unit 16 may provide the class values only for tunes specified by the user.

The bibliography information acquiring unit 18 reads music files from the music tune file storage 12 and reads out the bibliographic information of the music tune. For example, in the case where the music file is a MP3 file, text data such as the name of the tune, the name of a performer, the name of a composer, the name of an album, the date when the tune was released, or the like, is embedded using a standard code called an ID 3 tag. Among such bibliographic information, certain bibliographic information is extracted using a commonly-used method. Although "tunes" according to the present embodiment represents respective tunes, "music file" may be a unit (e.g., an album) and may include a plurality of tunes. Also, in this case, the processing is performed in a similar fashion.

The bibliography information acquiring unit 18 may acquire the bibliographic information from a source other than from the music files stored in the music tune file storage 12. For example, the bibliography information acquiring unit 18 may acquire sales, evaluation, or the like, via a network (not shown) or may acquire information, such as, the profile of a performer, the past works, or the like. That is, any information that can form a tune assembly may be utilized as bibliography information.

The distribution acquiring unit 20 acquires information indicating how the class values, which the class value providing unit 16 gives to respective tunes, are distributed in the whole tune assembly generated by the bibliographic information acquired by the bibliography information acquiring unit 18 (hereinafter, the information is referred to as "distribution information"). The distribution information may be a table representing the correspondence relation between the respective class values and the number or the proportion of tunes belonging to the class (hereinafter, referred to as "frequency"). Alternatively, the distribution information may be represented in a histogram where the horizontal axis represents class value and the vertical axis represents frequency. The distribution information may also be represented in a variety of other forms according to the purpose of using the distribution information. The distribution information for all tunes may be acquired prior to manipulation by a user. Alternatively, the distribution information may be acquired according to manipulation by the user.

The analysis result storage 22 stores: (a) music tune-class value table that associates the class values for respective tunes given by the class value providing unit 16 with identification information of the tunes; and (b) the distribution information for each tune assembly acquired by the distribution acquiring unit 20. However, only one of them may be stored depending on the purpose of utilizing the information. In the case of providing class values and acquiring distribution information for a large number of tunes prior to manipulation by a user, the analysis result storage 22 forms a database for storing information on tunes. The analysis result storage 22 may be a commonly-used storage, such as a hard disk, memory, or the like.

The music information processing apparatus 10 further includes: a input unit 24 that receives a variety of instructional input from a user; an evaluation unit 26 that evaluates the degree of correspondence of one of the groups, such as, tunes, albums, singers, or the like, by referring to class values or distribution information; and an output unit 28 that outputs information or the sound of the tune(s) obtained as the result of the evaluation. Although the processing detail performed by the input unit 24, the evaluation unit 26, and the output unit 28 differs depending on the functions that a user requires of the music information processing apparatus 10, in either case, the information requested by the user is returned by using at least either one of the class values or the distribution information.

The input unit 24 may be any one of the commonly-used input apparatuses, such as a button, a keyboard, a mouse, a trackball, a touch panel on a screen, or the like, as long as the input unit 24 allows a user to input at least instructions required for provided functions, for example, the start-up of an apparatus, the selection of tunes or albums, etc. The input unit 24 may be constructed separately; for example, a portion may be implemented as an input apparatus on the user side, and the other portion may be implemented as a receiving apparatus on the side of the evaluation unit 26.

The evaluation unit 26 evaluates, by using a statistical approach, the degree of correspondence between a plurality of distributions based on either the distribution information stored beforehand in the analysis result storage 22 or the distribution information newly acquired by the distribution acquiring unit 20 according to instruction by a user. The "degree of correspondence" is a similarity among distributions, which can be evaluated by a variety of methods. For example, the degree of correspondence may be the degree of overlap of frequencies for each class, which can be obtained by a histogram intersection, i.e., if the summation of smaller frequencies among frequencies belonging to a same class is larger, the degree of correspondence is large. Alternatively, the degree of correspondence may be determined so that it becomes larger if the mean and standard deviations of a distribution are close to that of another, respectively. Any other measure commonly utilized for statistical processing may be used.

Based on the evaluation result, the evaluation unit 26 determines the output information appropriate for functions required by the user. Once performing the evaluation, the evaluation unit 26 may store the evaluation result into the analysis result storage 22 and may reuse it when a similar analysis is required afterwards. Further, the evaluation unit 26 may evaluate the degree of correspondences for all the combinations among tune assembly stored in the music tune file storage 12, and may store the result into the analysis result storage 22 as a database containing the degree of correspondence. Alternatively, combinations for which the degree of correspondence is above a certain criterion may be determined to be of similar tune assembly and may be compiled as a database. In this case, evaluation processing can be replaced by searching in the analysis result storage 22 in accordance with the instruction for analysis from the user.

The output unit 28 can be implemented by a reproduction apparatus, display apparatus, or the like, and can display the name of tunes and the name of albums as a list, playback the tunes and outputs as sounds, or display a variety of information based on the distribution information. The output unit 28 may be constructed separately; for example, a portion thereof may be implemented as a transmitting apparatus on the evaluation unit 26 side and the other portion thereof may be implemented as an output apparatus on the user terminal side. Explanations on the concrete processing of the input unit 24, the evaluation unit 26, and the output unit 28 will be described afterwards, along with the functions that can be accomplished.

Figure 2:
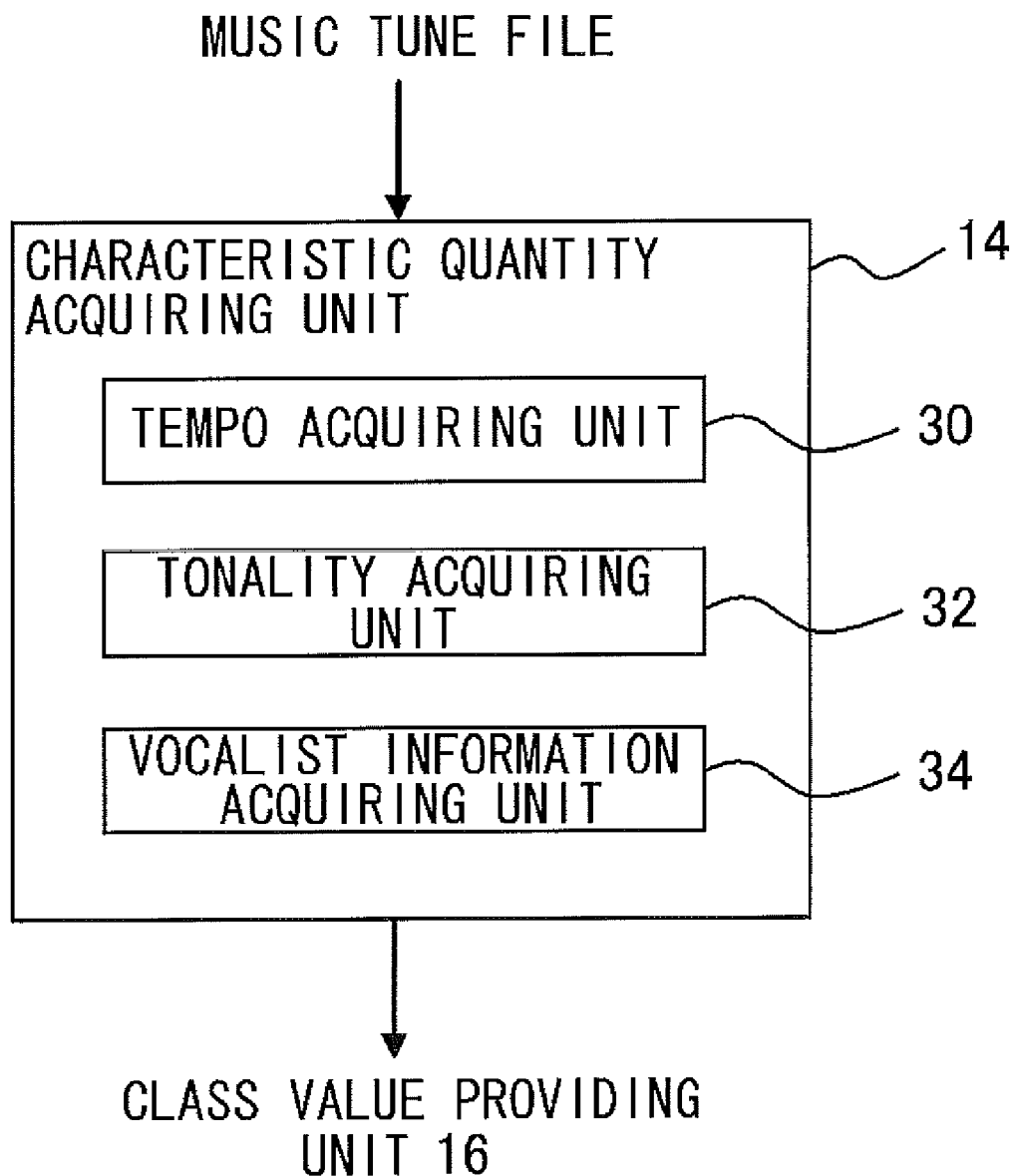
FIG. 2 shows a structure of characteristic quantity acquiring unit according to embodiment 1.

FIG. 2 shows a structure of a characteristic quantity acquiring unit 14. The characteristic quantity acquiring unit 14 includes a tempo acquiring unit 30 that acquires the tempo of tunes as a characteristic of the tunes, a tonality acquiring unit 32 that acquires tonality, and a vocalist information acquiring unit 34 that acquires the type of vocalist. The characteristic quantities acquired by their respective blocks shown in FIG. 2 and characteristic quantities shown in FIG. 3 are indicated as examples. Therefore, a variety of quantities or types that are determined for each tune may be used, as exemplified above. Practically, more than ten types of characteristic quantities may be introduced. The characteristic quantities to be introduced may be determined by experiment in order to adopt those characteristic quantities with which an accurate result can be obtained.

The tempo acquiring unit 30 acquires music data from music files and acquires the tempo value thereof. Although the tempo value is generally defined as the number of quarter notes per minute, the tempo value is not limited to this and can be any numerical value that represents what one classifies the music to be, such as, a slow tune, an up-tempo tune, or the like. For example, the tempo acquiring unit 30 decodes and processes music data and acquires a monaural music signal, accordingly. Then the tempo acquiring unit 30 performs signal processing, such as, Fast Fourier Transformation, or the like, on the acquired music signal so as to acquire time variations of tones, from which, the tempo of tunes can be obtained. In this process, beat information may also used so as to obtain a more accurate result.

The beat information represents the intervals between beats in a tune. The beat information can be obtained from music signals by detecting a band of frequencies corresponding to each musical instrument, selecting a band corresponding to the beat signals and smoothing the signals included in the band so as to pick up the potential positions of attack time and release time, and acquiring the basic periods from autocorrelation functions for respective bands, accordingly. Alternatively, any tempo analyzing method that is conventionally utilized may be used. In the case where the bibliographic information includes tempo, such as in the case of classical music, the information may be extracted from the music file.

The tonality acquiring unit 32 acquires music data from a music file and acquires the tonality thereof. The tonality may be only a distinction between major key/minor key or may be also a classification taking essential notes into consideration, such as, G-major, D-minor, or the like. Just as the case of the tempo acquiring unit 30, tonality may also be derived by acquiring the variation of tones. Further, the tonality acquiring unit 32 may also extract information on tonality from the music file in the case where the tonality is included in the bibliographic information, such as in the case of classical music.

The vocalist information acquiring unit 34 acquires music data from music files and acquires the type of vocalist, indicating whether the vocalist is male or female, whether it is a mixed chorus, or if the tune is an instrumental tune without a vocalist. Instead of the type of vocalist, differentiations according to the main musical instrument used may also be accepted. The vocalist information acquiring unit 34 determines the type of vocalist by detecting the frequency band corresponding to a human voice and by classifying it using a threshold value, or the like. In the case where the type of vocalist is included in the bibliographic information, the information may be extracted from the music file. The tempo acquiring unit 30, the tonality acquiring unit 32, and the vocalist information acquiring unit 34 transmit the characteristic quantities acquired, respectively, to the class value providing unit 16.

FIG. 3 exemplifies information on the correspondence between combinations of values of characteristic quantity and class values that are held in a class value providing unit 16. The class value definition table 100 includes a class value field 102, a tempo value field 104, a tonality field 106, and a vocalist field 108. In FIG. 3, it is assumed that tempo values are classified into four classes, i.e., when the number of quarter notes per minute is: less than 80, greater or equal to 80 but less than 120, greater or equal to 120 but less than 160, and greater or equal to 160, as an example. Tonality is assumed to be classified into the two classes of major key and minor key. The type of vocal is assumed to be the four classes of male vocalist, female vocalist, mixed chorus, and no vocalist. Accordingly, in the tempo value field 104, the tonality field 106, and the vocalist field 108, classes that respectively fall under these categories are distinctly described.

Since the class values are determined according to the combinations of respective characteristic-quantity values, as described above, each class of the tempo value field 104 corresponds to all classes of the tonality field 106, and each class of the tonality field 106 corresponds to all classes of the vocalist field 108. As a result, the combinations are: (four classes for tempo values)×(two classes of tonality classes)×(four classes of type of vocalist), thirty-two classes in total. In the class value field 102, natural numbers from 1 to 32 are entered as the class values and used for the identification information of those classes.

The boundary values that classify the characteristic quantities obtained as a numeric values, such as the tempo value, do not need to have equal interval but may be determined based on the distribution of all the tunes stored in the music tune file storage 12, the typical tendency, or the like. Alternatively, the boundary values may be adjusted according to feeling one gets when actually listening to tunes, experimental operation, or the like.

Figure 4:
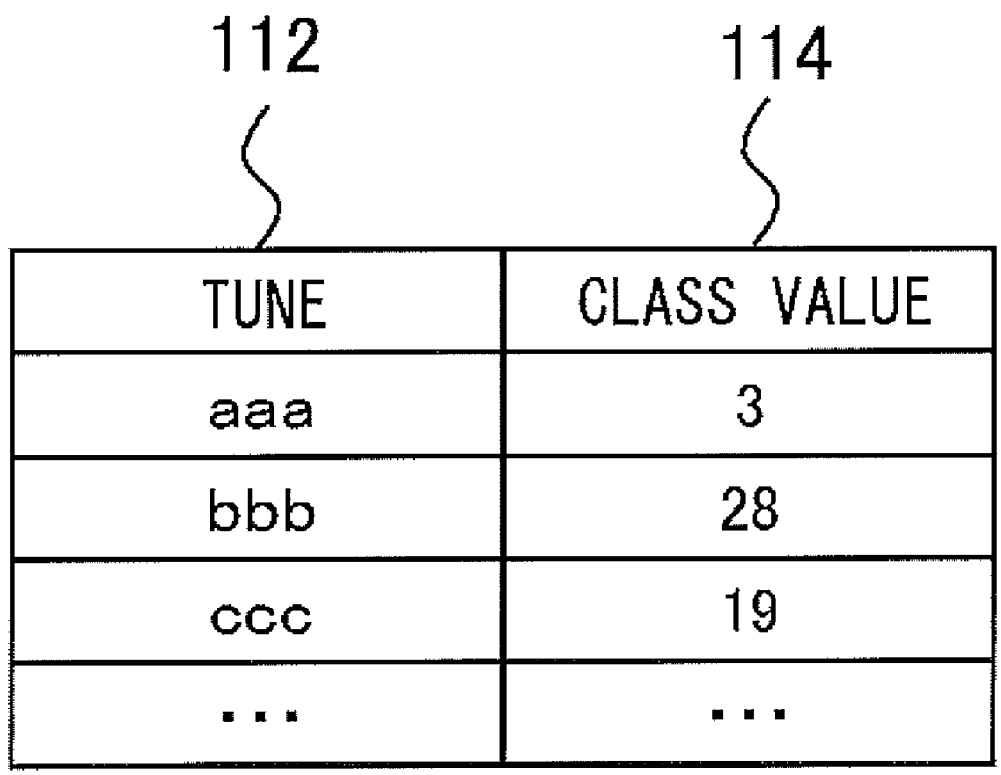
FIG. 4 shows an example of a music tune-class value table generated by the class value providing unit according to embodiment 1.

FIG. 4 shows an example of a music tune-class value table generated as a result of giving the music tunes their respective class values by the class value providing unit 16. The music tune-class value table 110 includes a music tune field 112 and a class value field 114. The class value providing unit 16 receives respective characteristic quantities that the characteristic quantity acquiring unit 14 acquired for each tune and detects the class to which the tune belongs to by referring to the class value definition table 100. The detected class is associated with identification information of a tune sent simultaneously from the characteristic quantity acquiring unit 14, the former recorded in the class value field 114 and the latter recorded in the music tune field 112.

In FIG. 4, the class of a tune named "aaa" is "3," the class of a tune named "bbb" is "28," and the class of a tune named "ccc" is "19." The identification information of a tune written in the music tune field 112 may be not only the name of the tune, but also the identification number, or the like, as long as the tune can be identified in a common format present in other functional blocks. The music tune-class value table 110 is stored in the analysis result storage 22, and the class value providing unit 16 adds an entry every time a new tune is given the class.

Figure 5:
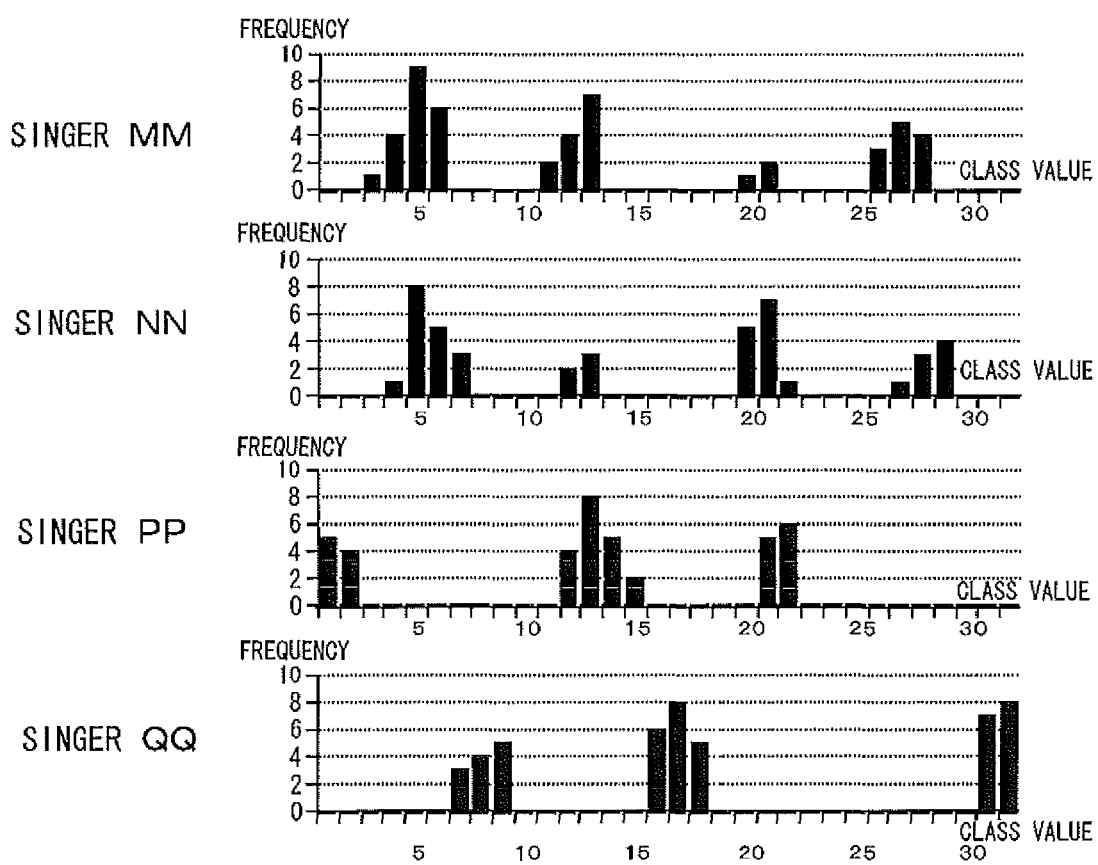
FIG. 5 shows an example of distribution information acquired by a distribution acquiring unit according to embodiment 1.

FIG. 5 shows an example of distribution information acquired by a distribution acquiring unit 20. As described above, the distribution acquiring unit 20 acquires from the class value providing unit 16 the correspondence between the tunes and the class values and also acquires predetermined bibliographic information, such as the album of the tune, the singer, or the like, from the bibliography information acquiring unit 18. Then the distribution acquiring unit 20 counts the number of tunes for the respective class values for each album or singer. This makes it possible to obtain the frequencies for respective class values as distribution information for the album or the singer. In FIG. 5, this information is represented in histogram format.

FIG. 5 shows an example of histograms indicating the distribution information for respective singers. Histograms for "singer MM," "singer NN," "singer PP," and "singer QQ" are shown from top to bottom. In each histogram, the horizontal axis indicates the class values of "1" to "32," respectively. The vertical axis indicates the number of tunes belonging to each class, listed as "frequency." The frequency may be the number of tunes itself or may be a value normalized by setting the maximum number of tunes to 1. Alternatively, the frequency may be a proportion to the number of all tunes. Tendencies for each singer can be found in the example of FIG. 5. For example, in the case of "singer MM," although the largest number of tunes belongs to the class value "5," tunes are distributed to a variety of class values, comparatively. In the case of "singer QQ," distributions are irregular to some degree. Such data may be presented to a user without modification, or the data may be used for further processing, such as, for evaluation of the degree of correspondence described below.

Figure 6:
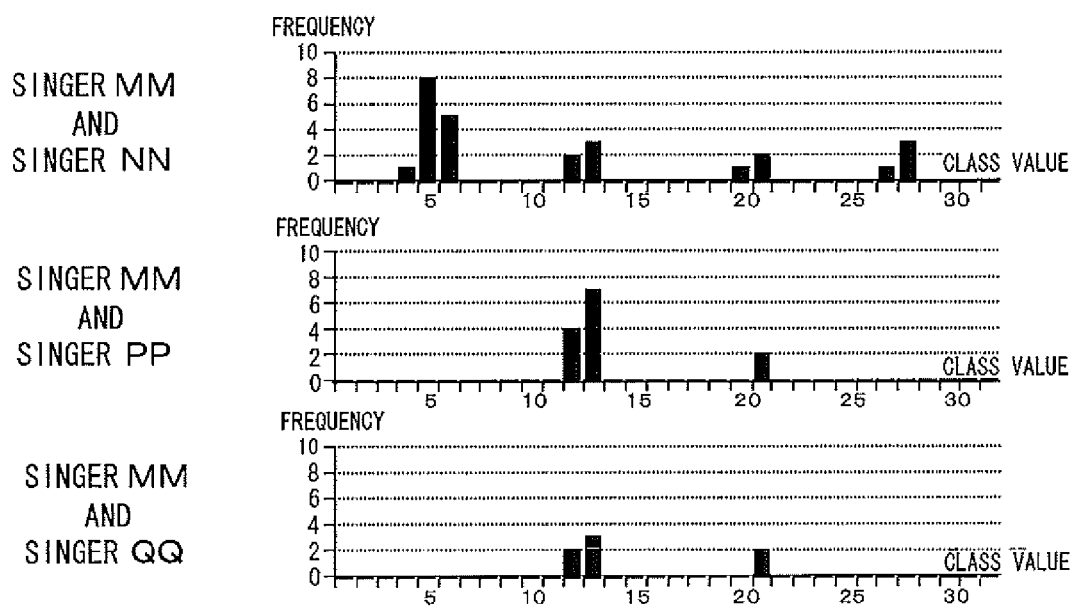
FIG. 6 shows a figure for evaluating the degree of correspondence between singers based on the distribution information for each singer shown in FIG. 5.

FIG. 6 shows the result of the application of a histogram intersection in order to allow the evaluation unit 26 to evaluate the degree of correspondence among singers based on the distribution information for each singer shown in FIG. 5. In FIG. 5, histograms represent the result of the histogram intersection for "singer MM" and "singer NN," "singer MM" and "singer PP," and "singer MM" and "singer QQ," as shown from top to bottom. The horizontal axis indicates class values and the vertical axis indicates the degree of overlapping frequencies between the two singers that are being compared.

According to FIG. 6, it is understood from the histogram on the top that "singer MM" and "singer NN" have a comparatively large overlap for a variety of class values, thus having strong similarity. Further, it is understood that "singer MM" and "singer PP" have similarity only for a part of the classes (from the histogram in the middle). In the case of the "singer MM" and "singer QQ," it is understood that they have comparatively weak similarity (from the histogram below). By representing the degree of overlap by also using the distribution of class values, it is possible to obtain not a vague impression of the singers but detailed information, such as, whether the tendency of the tunes, as a whole, is similar or whether a portion of the tunes tends to be similar.

For example, "singer MM" and "singer PP" have a large degree of overlap at class value "12" and "13." If these class values are set for common characteristic quantity values, such as, "slow tempo" or "minor key," it is determined that "singer MM" and "singer PP" have similarity only for the tunes having such characteristic quantities. Generally, one singer sings tunes of a variety of characteristics, ranging from heavy tunes, such as Rock songs, to slow-tempo tunes, such as Ballads. Some listeners may like all the tunes of the singer, but other listeners may like some tunes of the singer that have a certain characteristic, such as that of a Ballad, or the like, especially. Naturally, the liking also changes with the mood or situation.

Using distribution information, such as the one shown in FIG. 6, makes it possible to automatically associate a tune and a singer that belong, respectively, to different groups of different granularities. For example, a tune that a user likes can be associated with a singer who sings another tune similar to the tune that the user likes, or a singer that a user likes can be associated with a tune sung by another singer having a common characteristic with the singer that the user likes. As a result, information that matches a detailed condition required by a user can be easily provided. Further, by summing the frequencies for the respective class values, the overall similarity can be represented as an explicit numerical value.

In FIG. 5 and FIG. 6, information on singers is used as bibliographic information, and distribution information for each singer is used so as to acquire similarity among the singers. As described above, information constituting tune assembly is not limited to information on singers but also on albums, genres, eras, sex of the singers, etc. Further, the manner for representing the distribution information or the degree of correspondence thereof is not limited to that shown in FIG. 5 or FIG. 6, but a commonly used method for statistical processing may be applied. In addition, when calculating the histogram intersection, further processing such as weighting, or the like, may be applied to the original distribution information. For example, in the case of a singer who sings less number of tunes, regardless with whom the histogram intersection is calculated, the value of the intersection remains small. In order to cope with such a case, if the total number of tunes a singer sings is less than a predetermined threshold, the distribution information may be multiplied by a predetermined factor so as to make the "frequency" larger, and then the degree of correspondence may be evaluated.

Next, by using the variety of information described above, an explanation will be given on an exemplary function that can be provided by the music information processing apparatus 10.

(1) A function for recommending new singers, albums, music tunes, or the like, based on preferred tunes.

Figure 7:
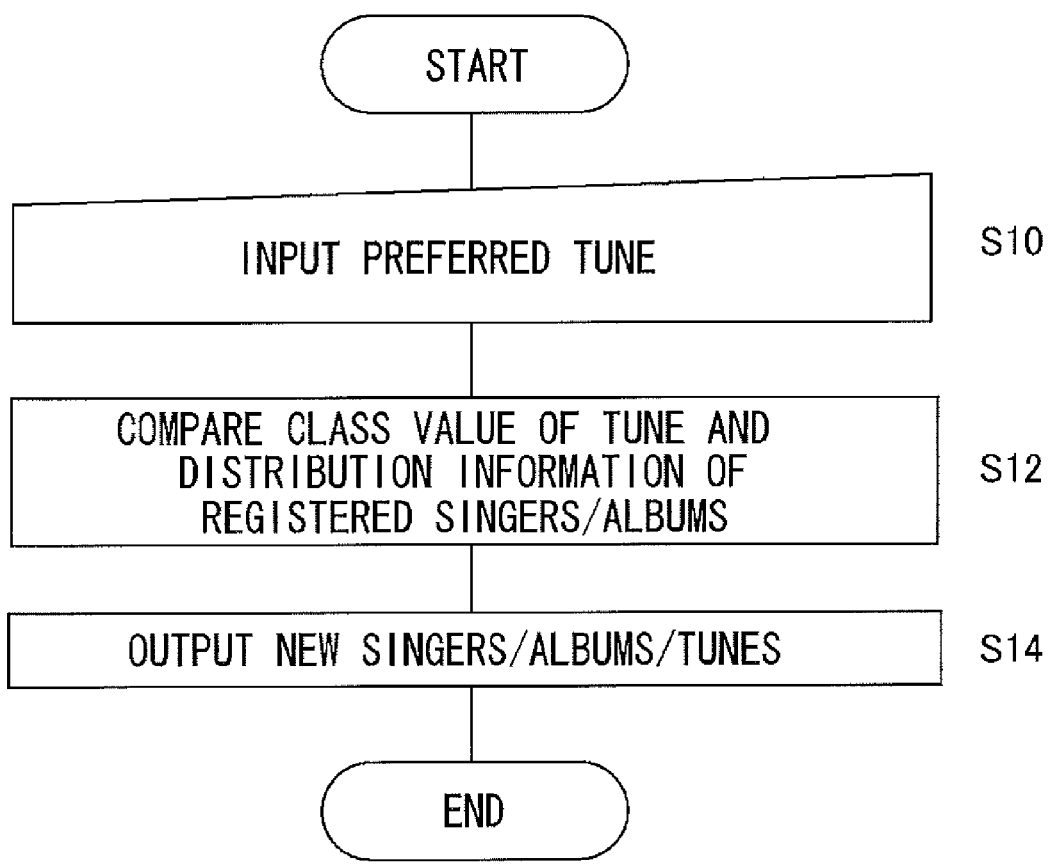
FIG. 7 is a flowchart showing a processing procedure for providing a function according to embodiment 1 where singers, albums, or tunes are recommended based on an input tune.

FIG. 7 is a flowchart showing a processing procedure for providing a function where singers, albums, or tunes are recommended based on an input tune. First, the input unit 24 receives user input for specifying a tune that the user likes or would like to listen to at that moment (S10). Then, the evaluation unit 26 compares the class values of the tune and the distribution information on singers or albums registered in the analysis result storage 22 (S12). The input unit 24 may further receive a user input for specifying singers or albums to pick up for further selection, and the evaluation unit 26 may compare the tunes or albums that have been picked up.

If the class values of input tunes are stored in the analysis result storage 22, those values may be used and if not stored, an analysis based on music data may be newly performed, and the class value providing unit 16 may provide the class value, accordingly. This procedure can be applied to other functions, which will be explained later. Then, the singers or albums having a large degree of correspondence with the input tune are detected. In order to determine whether the degree is large, a detection condition is set in advance by a value acquired experimentally or theoretically. For example, albums are detected as album sets having high "degree of correspondence", in which more than a certain percentage (e.g., 40 percent) of the tunes included have the same class value as that of the input tune.

In some cases, the detection condition may be set so as to detect: (a) a singer or an album having the lowest degree of correspondence with the input tune, (b) a singer or an album having a predetermined percentage of frequencies at a class value of a class that have a predetermined relation with the class of the input tune (e.g., the class neighboring the input class), or the like. As described above, a variety of detecting conditions may be set beforehand according to if-cases, and a user may be allowed to make a choice among the conditions. Further, tunes that have the same class value with that of the input tune may be extracted from the tunes belonging to the detected albums or singers. The output unit 28 outputs the result by, for example, displaying the detected singers, albums, tunes, or the like, as a list or by playing back the music data itself, etc. (S14).

In this function, singers or albums are recommended while taking the similarity into account by using the characteristics of the tunes specified by a user. This makes it possible to provide recommendation information reflecting a more specific preference than a rough association, such as, similar singers determined simply by a vague impression. Therefore, recommended singers or albums may change when another tune is input, even if that tune is performed by the same singer. This function allows a user to know much more about new singers or albums that fit his/her own liking. A user may input a plurality of tunes. In this case, recommending albums or singers represented by class values that include a majority of the class values representing the input tunes makes it possible to narrow down the targets to be recommended.

(2) A function for recommending other singers, albums, music tunes, or the like, based on a favorite singer or album.

Figure 8:
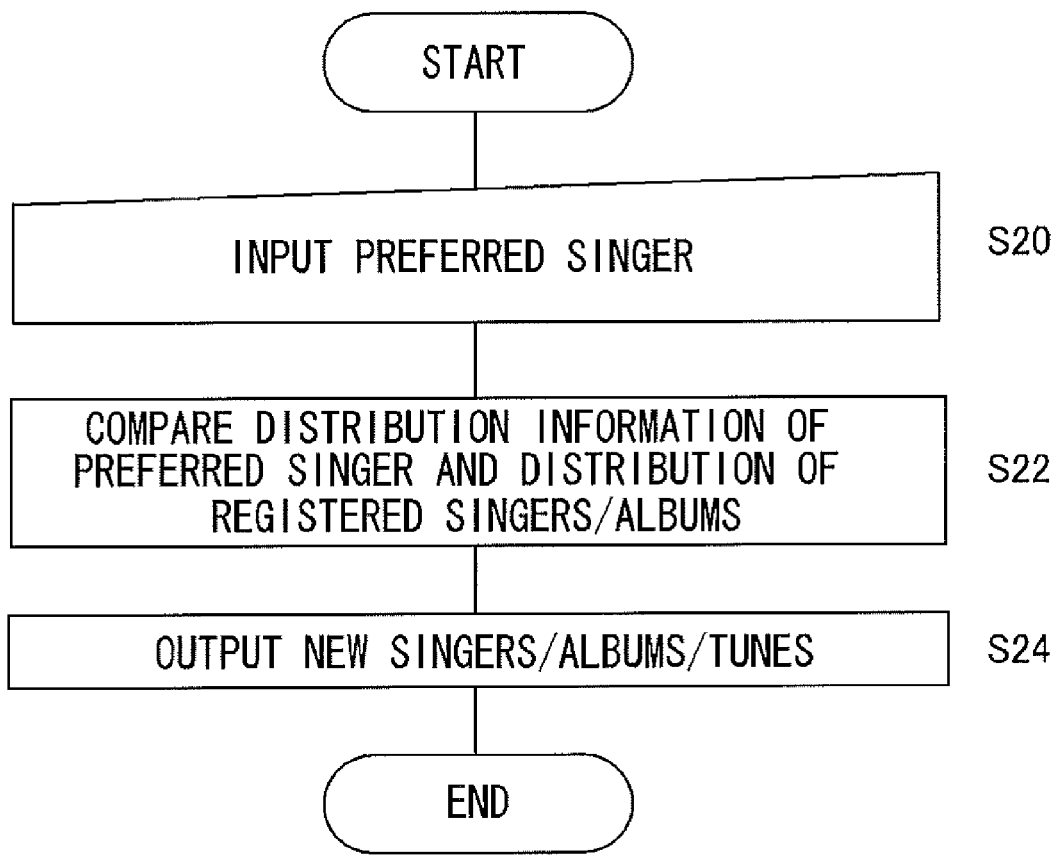
FIG. 8 is a flowchart showing a processing procedure for providing a function according to embodiment 1 where other singers, albums, or tunes are recommended based on an input singer.

FIG. 8 is a flowchart showing a processing procedure for providing a function where other singers, albums, or tunes are recommended based on an input singer. First, the input unit 24 receives user input for specifying a singer that the user likes or would like to listen to at that moment (S20). The input unit 24 receives may be input for specifying an album instead of a singer. Then, the evaluation unit 26 compares the distribution information on the singer and the distribution information on singers or albums registered in the analysis result storage 22 (S22). The input unit 24 may further receive a user input for specifying singers or albums to pick up for further selection, and the evaluation unit 26 may compare the singers or albums that have been picked up. Alternatively, user input for specifying a genre may be received, and the singers or albums that belong to the genre and that are registered in the analysis result storage 22 may be extracted as targets for further selection.

Then, the singers or albums having a large degree of correspondence with the input singer are detected. For example, as shown in FIG. 6, the degree of overlap between the distributions of both singers or albums to be compared is obtained by using a histogram intersection, and a singer or an album that has the sum of the degrees of overlap larger than a predetermined threshold is specified, accordingly. Another statistical method may be used as an indicator of the degree of correspondence. Further, the detection condition is not limited to whether there is a large degree of correspondence, but a variety of conditions may be prepared beforehand, and a proper one may be set according to instruction by the user in a similar manner as explained in the function of (1). Further, tunes having class value of which the degree of overlap is larger than a predetermined value may be extracted from the tunes included in the selected singer's tunes or in the selected albums. The output unit 28 output the result by, for example, displaying the detected singers, albums, tunes, or the like, as a list, or by playing back the music data itself, etc. (S24). In the case where many singers, albums, or tunes are extracted, the ones with a larger degree of overlap are given priority for being output.

With this function, a musical preference hardly represented by words or numerals is analyzed as distribution information by specifying a singer or an album, and other singers or albums along a similar line are recommended according to the degree of correspondence among a plurality of pieces of distribution information. This makes it possible to recommend singers or albums based on the characteristics of actual tunes rather than the bibliography information, such as, genres, similar singers, etc., classified by humans. For example, a singer belonging to another genre or a singer having different music style, which is difficult to detect by using bibliography information, can also be recommended. This allows a user to broaden the range of music he/she listens to.

In this function, a user may input a tune. In this case, the singer who sings the tune or the album that includes the tune are specified by the bibliography information instead of the processing of step S20. Further, a user may input a plurality of tunes. In this case, first, the distribution information for the input singer, or the like, is acquired, then the degree of overlap of class values commonly observed among those singers are calculated by using histogram intersection, and singers or albums having large degree of correspondence with the degree of overlap is recommended accordingly. This allows a user to narrow down the recommended targets. Further, when receiving input regarding a preferred singer, input specifying a singer or a genre to be compared may also be received at the same time so as to recommend tunes having class values of which the degree of overlap with the distribution information of the preferred signer is larger than a predetermined value. This allows a user, when trying out a new singer or a new genre for the first time, to start listening to tunes giving off similar feelings as the accustomed tunes, and, therefore, push-backs for the first-time tunes will be decreased.

Further, it is common that the class values for each tune sung by one singer or included in one album tend to be dispersed to a variety of class values, as shown in FIG. 5. Therefore, the output unit 28 may be configured to have a structure, such as a network radio, for delivering a plurality of music and may deliver tunes, one after another, having the same class value of the tunes sung by the singer as specified by the user or of the tunes included in the albums as specified by the user. This makes it possible to provide tunes having a variety of class values in the range of dispersion of the specified singer or the album. That is, music tunes having an appropriate range of variety can be delivered, as compared to the case where tunes having the same class value are delivered, while making it easy for a user to accept the variety since the tunes to be delivered have characteristics inherited from the singer whose tunes the user is accustomed to listening to.

(3) A function for extracting tunes having high commonality among tunes of a plurality of singers or albums.

Figure 9:
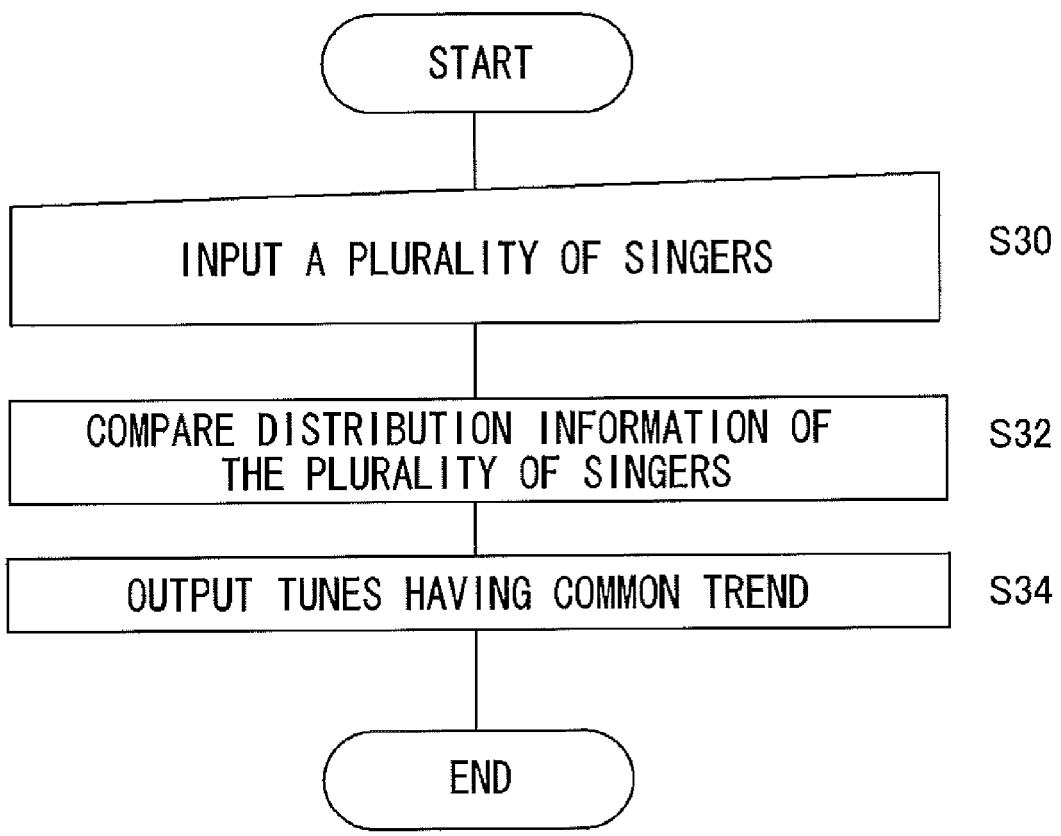
FIG. 9 is a flowchart showing a processing procedure for providing a function according to embodiment 1 where tunes that have high commonality among tunes performed by an input plurality of singers are extracted.

FIG. 9 is a flowchart showing a processing procedure for providing a function where tunes are extracted that have high levels of commonality among tunes performed by a plurality of singers that are input. First, the input unit 24 receives user input for specifying a plurality of singers (S30). The input unit 24 receives may be input for specifying albums instead of singers. Then, the evaluation unit 26 compares the distribution information among the input singers and extracts the class values that have a large frequency, for all the singers in common (S32). For example, the degree of overlap for each class value for all the singers is examined, and a class value having the degree of overlap larger than a predetermined threshold is extracted as having "large frequency in common." In this case, in order to enable extraction in the similar manner, even if a singer that has released a small number of tunes is input, a comparison may be made after weighting, for example, after multiplying the distribution information of the singer by a predetermined factor, etc.

Alternatively, the frequency of the class values for each singer may be ranked, and if there is a class value common to input singers among the class values having a high-level frequency, the class may be determined to have a "large frequency in common." Then a music tune-class value table 110, or the like, may be referred, and among the tunes of the singers, tunes having the extracted class value are specified. The output unit 28 outputs the result by, for example, displaying the specified tunes, or the like, as a list, or by playing back the music data itself, etc. (S34).

Sometimes, even tunes sung by the same singer have totally different elements, because of a change in policy or the broadness of the music range. In this function, providing tunes having characteristics commonly included in a plurality of singers allows a user to find an unexpected musical link between singers or gives one an opportunity to find an aspect, which the user never sensed, even for a singer of whom the user thinks that he/she knows well. Further, by examining the commonality among a plurality of singers whom a user is vaguely fond of, the user can find the field he/she is searching for. Since it is possible to extract, in bulk and from a plurality of albums, tunes having a similar atmosphere, a selection album can be made automatically, and tunes having an atmosphere that fits the feeling can be played back in sequence.

Figure 10:
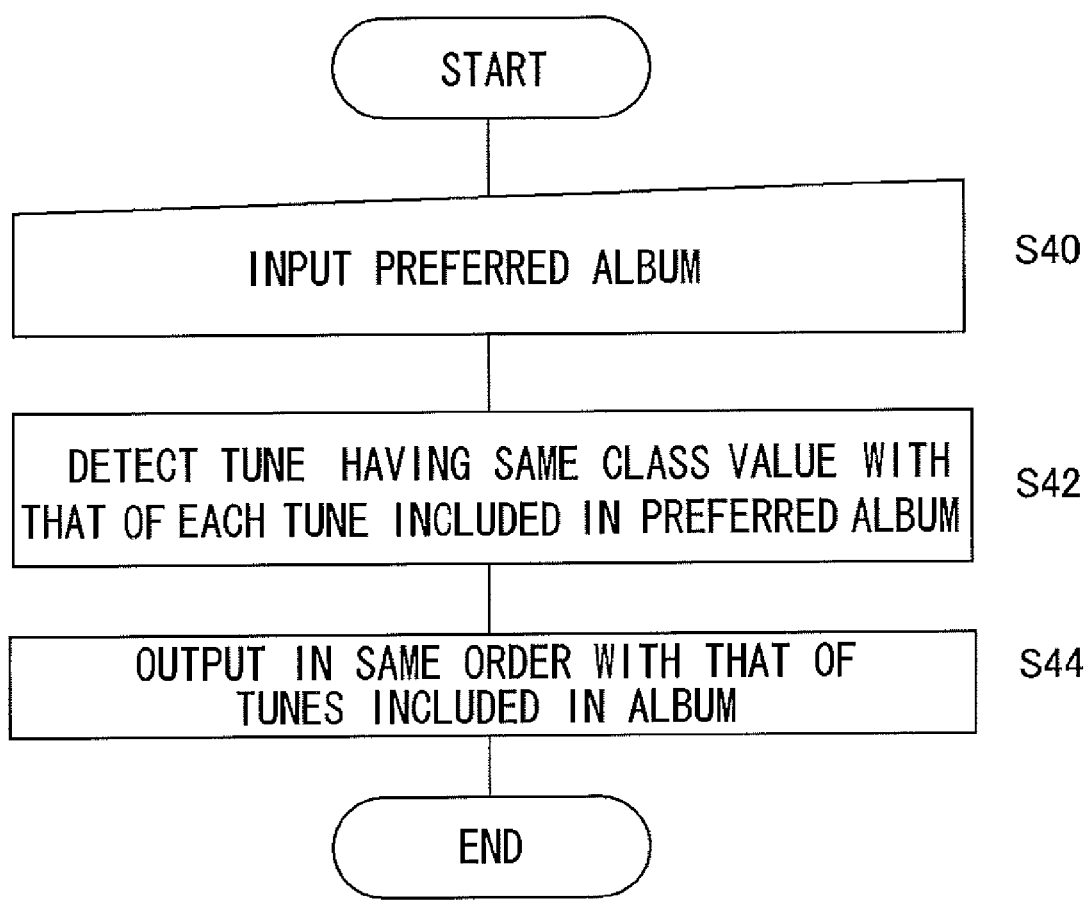
FIG. 10 is a flowchart showing a processing procedure for providing a function according to embodiment 1 where tunes of other performers, or the like, are selected in the same order as the structure of an input album.

(4) A function for selecting tunes in the same order of the structure of preferred album FIG. 10 is a flowchart showing a processing procedure for providing a function where tunes of other performers, or the like, are selected in the same order as the structure of an input album. First, the input unit 24 receives user input for specifying an album that the user likes (S40). Then, the evaluation unit 26 acquires the class values of the tunes included in the album and then detects tunes having the same class values as the respective class values from other singers or other albums registered in the analysis result storage 22 (S42). The input unit 24 may further receive user input for specifying singers or albums to be searched for and detected, and the evaluation unit 26 may perform screening and detection on the specified singers or albums.

Figure 11:
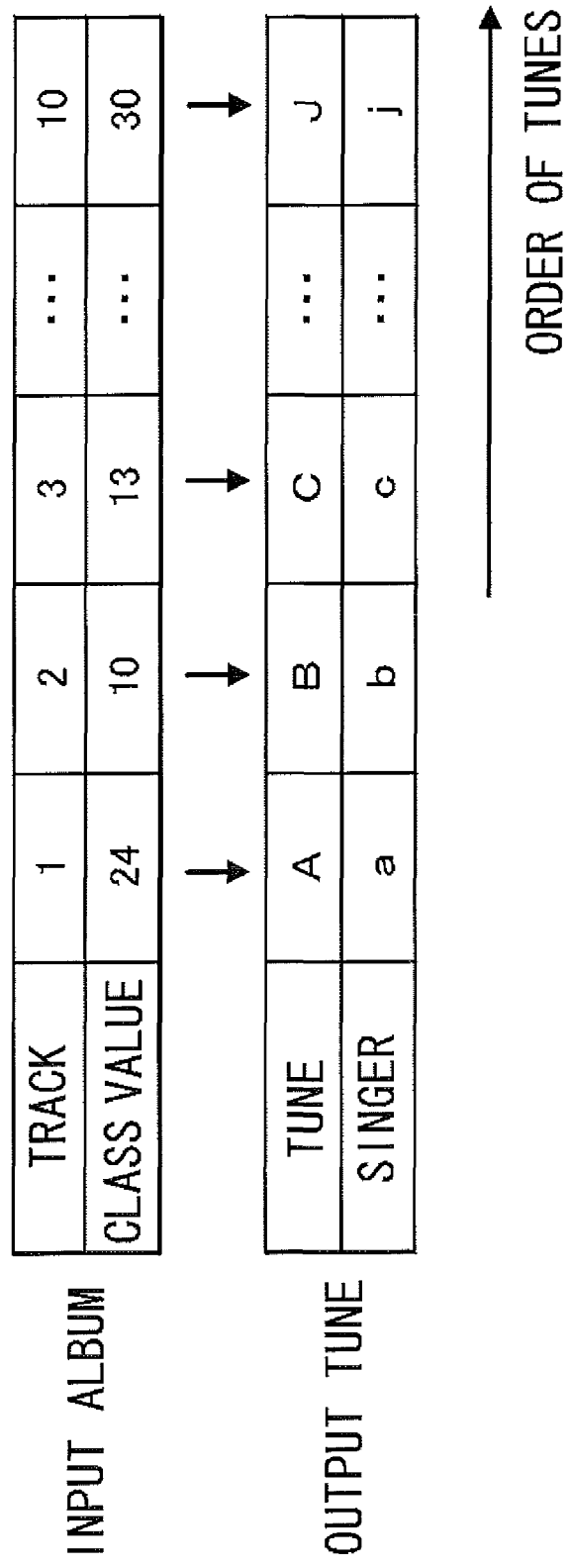
FIG. 11 shows the correspondence between an input album and the output tunes in the function according to embodiment 1 where tunes are selected in the same order as the structure of an input album.

The output unit 28 refers to the order of tunes included in the input album and playbacks and outputs the detected tunes having respective class values in the same order as the respective class values coming up in the input album (S44). FIG. 11 explains correspondence, in this function, between an input album and output tunes. The upper table in FIG. 11 indicates an example of the relation between the order of tunes included in "input album" and the class values. The lower table in FIG. 11 indicates an example of the relation of the order of "output tunes" and the respective singers thereof. For both tables, the horizontal axis indicates the order of tunes. In this example, the "input album" includes ten tunes, that is, from track 1 to track 10, having class values of "24," "10," "13," . . . , "30," respectively.

In this case, the evaluation unit 26 detects tune "A" having class value "24," tune "B" having class value "10," tune "C" having class value "13," . . . , tune "J" having class value "30" from the tunes registered in the analysis result storage 22. In this case, no limitation is set for singers who sing the tunes to be detected, and the singers may differ, such as singer "a," "b," "c," . . . , "j," as shown in FIG. 11. Alternatively, if a user specifies a singer or an album, screening and detection are performed on the tunes of the specified range. Then the output unit 28 reproduces the tunes thus detected in the order of class values corresponding to the order of tunes included in the original album.

Generally, the order of tunes included in an album is, in many cases, formulated deliberately according to the author's intention, such as how he/she would like the listeners to listen to the album, what impact the album should have on the listeners, whether the author means to express a unique vision, or the like. Therefore, even in the case of continuously listening to independent tunes, by playing back the tunes in a similar stream as that of the tunes included in a favorite album, the intention of the author of the original album can be reflected to other tunes. This makes it possible to listen to independent tunes in succession, the tunes having moderate variation among themselves as though they are tunes from a completed album.

Figure 12:
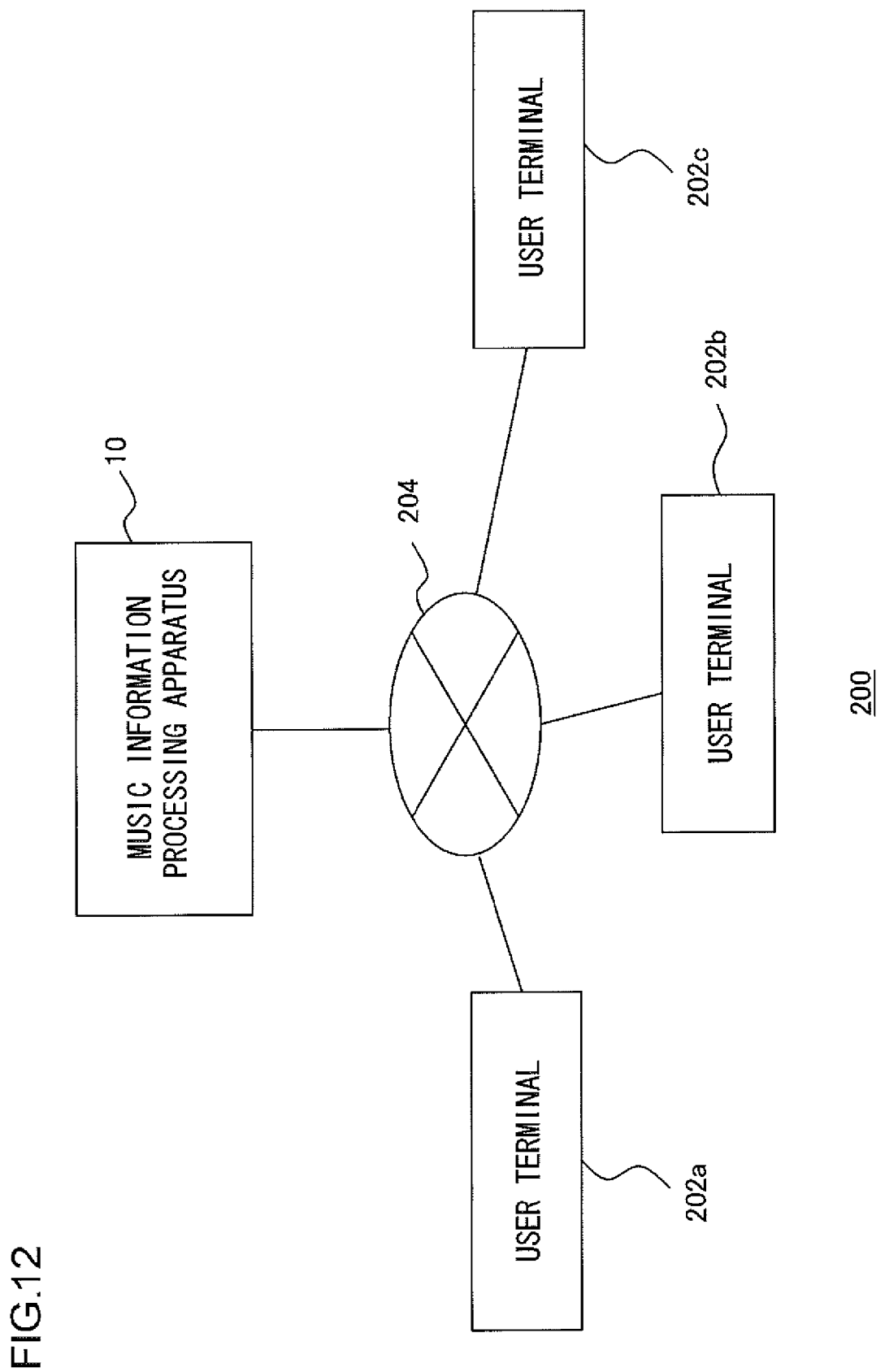
FIG. 12 shows a structure of a music information processing system that is an application of the music information processing apparatus according to embodiment 1.

FIG. 12 shows a structure of music information processing system that is an application of the music information processing apparatus 10 described above. The music delivery system 200 has a structure where the music information processing apparatus 10 and a user terminal 202a, a user terminal 202b, and a user terminal 202c are connected via a network 204. In such a structure, a user starts a dedicated software program by using the user terminal 202a, or the like, and inputs information on tunes, albums, or singers of his/her preference on the input screen, or the like. The input information is transmitted to the music information processing apparatus 10 via the network 204.

The music information processing apparatus 10 that received the information selects an album, or the like, that is similar to the album of the user's preference, by using the processing procedure for implementing the variety of functions described above, and returns the music data extracted from the album, or the like. The user then listens to the music sent from the music information processing apparatus 10 and received by the user terminal 202a, or the like.

Instead of inputting preferred tunes, or the like, into the user terminal 202a, or the like, the user terminal 202a, or the like, may automatically send to the music information processing apparatus 10 the information on music tunes that the user recently received and listened to. In the music information processing apparatus 10, the sent information may be stored for each user, and when the user makes a request to send new music data, an analysis as described above may be performed based on the stored information. This allows users to listen to new tunes based on preferred tunes at any time without spending the time and effort of inputting data by themselves.

Embodiment 2

In the embodiment 1, links among singers, albums, tunes, or the like, are found by using the distribution information obtained for respective tune assembly formed by the albums or singers and the class values of the tunes, and music that suits a user's preference is detected and output. In the present embodiment, an analysis of the singers, performers, or albums is performed using the distribution information, and the result of the analysis is visualized and provided to a user in a style that is easy to understand. An apparatus may be structured in a similar manner as the one indicated in FIG. 1. The distribution information for each album is also acquired in a similar manner. An explanation will be given below, focusing on the points that are different from the embodiment 1. Explanation will be given on an example of visualization while referring to FIGS. 13-16, those figures showing exemplary screen images displayed on a display apparatus, which is a part of the output unit 28.

Figure 13:
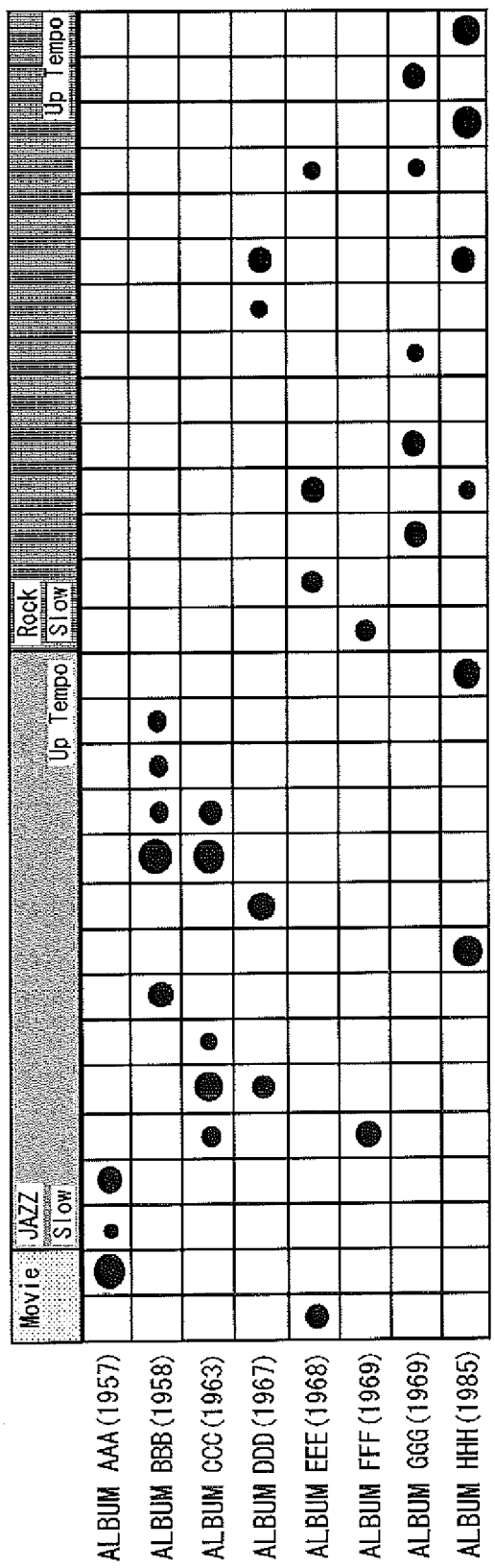
FIG. 13 shows an exemplary screen image displaying a distribution of characteristics of tunes for each album according to embodiment 2.

FIG. 13 shows an exemplary screen image representing a distribution of characteristics of tunes for each album. In the album-characteristic-distribution-displaying screen 120, the frequency for each class is represented by the size of a circle in a matrix, where one line represents one album and one column represents one class. The class where the frequency is zero remains blank. The album-characteristic-distribution-displaying screen 120 can be deemed to be a representation of the distribution information indicated in FIG. 5, the order of the class is interchanged according to the characteristic quantity being focused on. In the example of FIG. 13, genres and tempos are focused on as the characteristic quantities, and classes belonging to the "Movie" (film music) genre, "Jazz" genre, and "Rock" genre are displayed in a lot, respectively, while tempos are displayed so as to show a gradually shifting, from slow tempo on the left side to quick tempo on the right side.

At the left side of each level, bibliography information, such as the name of each album and the year the album was released, is displayed, and, at the top, a sequence of characteristic quantities are displayed using brief language while the different genres are represented by different colors. In order to be displayed on the album-characteristic-distribution-displaying screen 120, the distribution information of a previously released album of one performer, whom a user specifies and inputs into the input unit 24, is first read by the evaluation unit 26 from the analysis result storage 22. Then, the display order of the classes is determined so that the magnitude of relation of the characteristic quantities or the segmentation becomes clear. The set of the combined "characteristic quantity to be focused on" and "the order of class" may be set beforehand. Alternatively, a plurality of sets may be prepared for a user to select.

Further, bibliography information such as the released year of the album, or the like, which the distribution acquiring unit 20 acquired from the bibliography information acquiring unit 18 and stored into the analysis result storage 22, is also read out. The output unit 28 transforms the frequency of each class to the size of a circle in a display order determined by the evaluation unit 26 and draws the distribution information while displaying the bibliographic information on the left side and the characteristic representation at the top. The words or colors displayed at the top may be prepared in advance while associated with the characteristic quantities to be focused on. The words displayed at the top may be a characteristic quantity that can be acquired directly from the music data or may be a secondary characteristic quantity that can be presumed from the characteristic quantity that is directly acquired. In either case, it is preferable to select the quantity so as to allow one to grasp the music characteristic at first glance.

According to the album-characteristic-distribution-displaying screen 120 in FIG. 13, this performer has released albums biased towards film music or jazz music and albums biased towards rock. In this way, it can be grasped at first glance which album has which genre of music tunes greatly represented, etc. One performer or singer often releases a plurality of genres regarding tunes. However, such detailed information can hardly be obtained. By the album-characteristic-distribution-displaying screen 120, a user can select an album based on his/her preference even the album is of performers or singers with whom the user is not familiar. Further, if the albums are sorted in order of release date and displayed, for a performer who has different tendencies depending on his/her age, the tendencies can be grasped at first glance.

Generally, genres are fixed according to the bibliography information, such as performers, or the like, and, thus, even if the performer has released works belonging to another genre, a person who is not a fan of the performer has no way of knowing their release. As a result, people would not feel like determining which tune to listen to based on the genres listed in bibliography information. Further, categories of genres tend to be determined by subjectivity of the person who sets the bibliography information or by general impression, and, thus, sometimes disjunction is observed between the information and the actual work. By the album-characteristic-distribution-displaying screen 120, based on an objective scale, i.e., the distribution information of the class value, the distribution of genres of tunes included in an album can be grasped. Situations where users keep a distance from certain tunes without listening to them can be lessened, and users can broaden their rage of music starting with a tune that is easy to accept. Further, even when a tendency of a singer or performer changes, accurate information can be provided without spending time and effort such as by manually re-setting information.

Further, by allowing a user to select, using a pointing device, or the like, one of the graphic symbols such as a circle, or the like, displayed on the matrix in the album-characteristic-distribution-displaying screen 120, the tune corresponding to the symbol may be reproduced or detailed information may be displayed. This allows a user to directly access a tune in which he/she is interested. Although the explanation is given above by focusing on genre, the characteristic quantities in the present embodiment can include a variety of elements besides genre by preparing a variety of characteristic quantities to be focused on, allowing tendencies to be displayed from another aspect.

Figure 14:
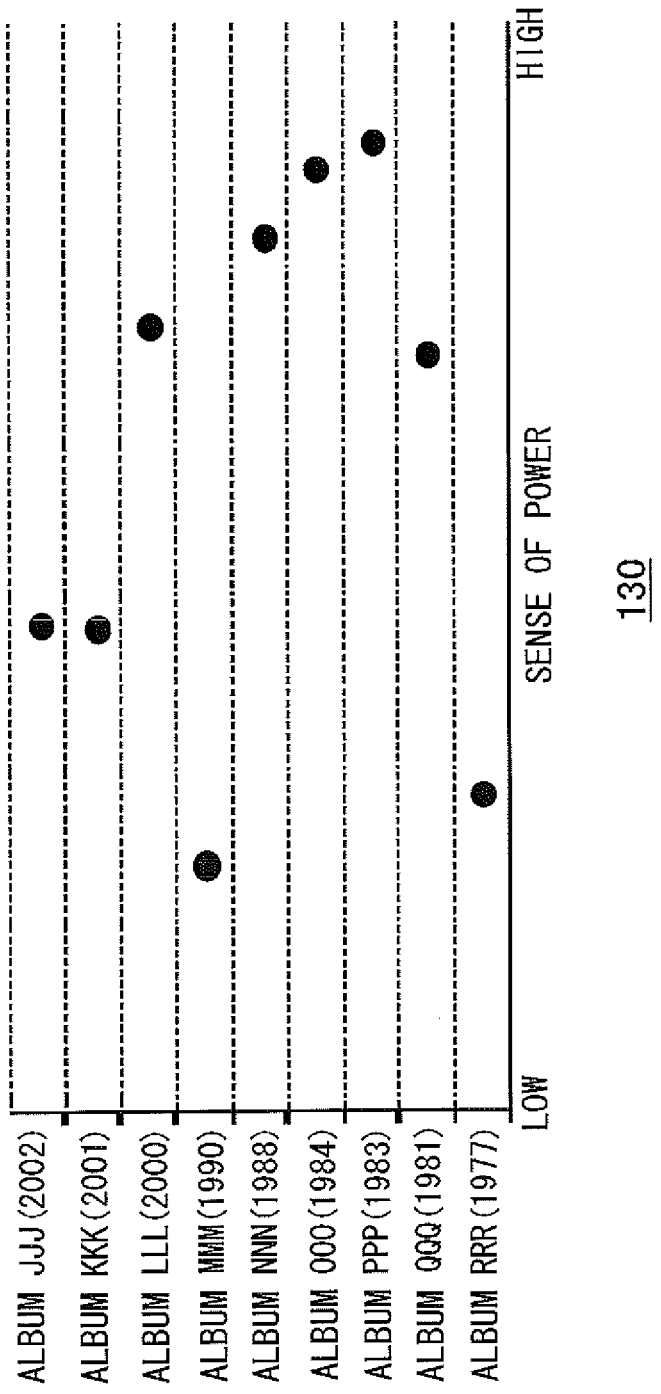
FIG. 14 shows an exemplary screen image displaying characteristics of tunes for each album according to embodiment 2.

FIG. 14 shows an exemplary screen image displaying the characteristics of tunes for each album. While in the album-characteristic-distribution-displaying screen 120 of FIG. 13, the frequencies of class values for each album are represented by the size of the circles, and in the album-characteristic-quantity-displaying screen 130 of FIG. 14, the level of a certain characteristic quantity is represented for each album. In the example of FIG. 14, the evaluation values based on the "sense of power," which is one of the characteristic quantities, are represented for their respective albums. The "sense of power" is a characteristic quantity that can be calculated using tempos, intervals between beats, or the like, and is one of the scales to represent genres, such as jazz, dance, funk, rock, or the like. The "evaluation value" may be an averaged value of the "sense of power" for each album, averaged class values of the "sense of power" for each tune, the class value most frequently included, or the like. A predetermined calculation method for "evaluation value" is set in advance.

In this case, the values of the "sense of power," which are acquired by the characteristic quantity acquiring unit 14 for respective tunes included in an album, are stored in the analysis result storage 22. Then the evaluation unit 26 reads out from the analysis result storage 22 the value of the "sense of power" for the tunes included in any album ever released by one performer whom a user specifies by inputting to the input unit 24. Then the evaluation value of the "sense of power" for each album is calculated. The output unit 28 represents the evaluation value by using dots while setting the horizontal axis to indicate the magnitude of the evaluation value. Alternatively, a line graph or histogram may be adopted, and the vertical axis and the horizontal axis may be interchanged. In the example of FIG. 14, albums are sorted in order of release year and represented along the vertical axis.

The characteristic quantity to be displayed is not limited to the "sense of power" but may be any characteristic quantity obtained by the characteristic quantity acquiring unit 14 or may be a secondary characteristic quantity that can be calculated from the characteristic quantity acquired by the characteristic quantity acquiring unit 14. Further, the characteristic quantity to be displayed may be set to be changeable. Further, evaluation value to be displayed may be any value acquired using a statistic method, such as, for example, the weighted average of the characteristic quantities, the deviation value calculated by setting any album of the performer or an album of another performer as the norm.

According to the album-characteristic-quantity-displaying screen 130 in FIG. 14, this performer released albums with a high "sense of power," especially during the 1980's. In this manner, representing the evaluation values of the characteristic quantities calculated for each album, or the like, makes it possible to easily grasp the position of a certain album among all the albums or to easily compare two albums. Further, listing in the order of release date allows a user to know transitions along the years. Users can obtain such information without reading detailed profiles or discographies, and they can gain a foothold when selecting an album to listen to. In order to allow users to grasp this information more easily, the manner of changing of the characteristic quantity may be represented by changing colors or shapes.

Figure 15:
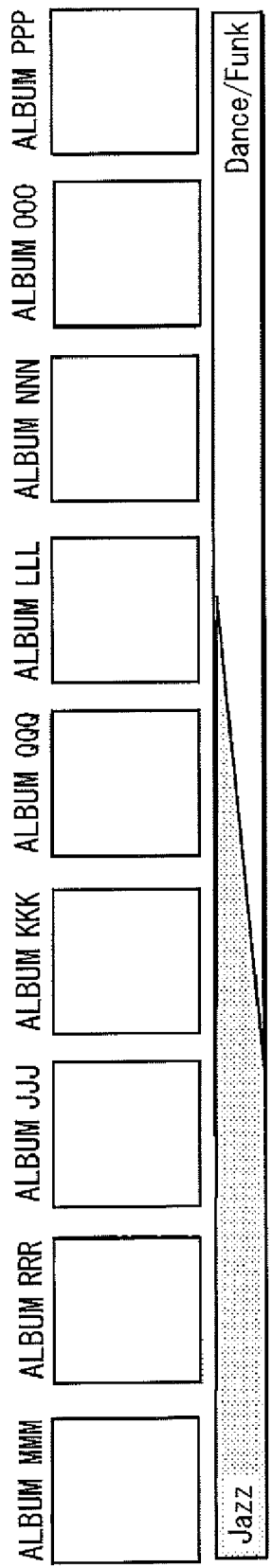
FIG. 15 shows an exemplary screen image displaying a particular tendency of each album according to embodiment 2.

FIG. 15 shows an exemplary screen image displaying tendencies of respective albums. The album-tendency-displaying screen 140 may be drawn utilizing the values calculated in the album-characteristic-quantity-displaying screen 130 in FIG. 14. That is, albums are sorted by the evaluation values of the "sense of power" and disposed with jackets of their respective albums from left to right. Generally, the lower the "sense of power" is, the jazzier the album is, and the higher the "sense of power" is, the funkier and more hip-hop-related the album is. Using this, albums shown on the left are jazzy, albums shown on the right are dance-oriented, funky, and danceable, and albums shown in the middle have both feelings.

In this example, the "sense of power" is replaced by the genre, and the words "Jazz" and "Dance/Funk" are written in the lowest level in FIG. 15, however, the type of tendency to be represented may differ from one characteristic quantity to another. For example, when utilizing a tempo as the characteristic quantity, albums wholly slow-tempo to albums wholly up-tempo can be disposed in that order. In this manner, by disposing of albums in order of evaluation value of the characteristic quantity calculated for the respective albums, feeling of each album, in whole, can be easily compared. Further, by displaying images of the jackets, the ambience obtained from the images can be expressed simultaneously, which efficiently supports the user's selection of an album.

Figure 16:
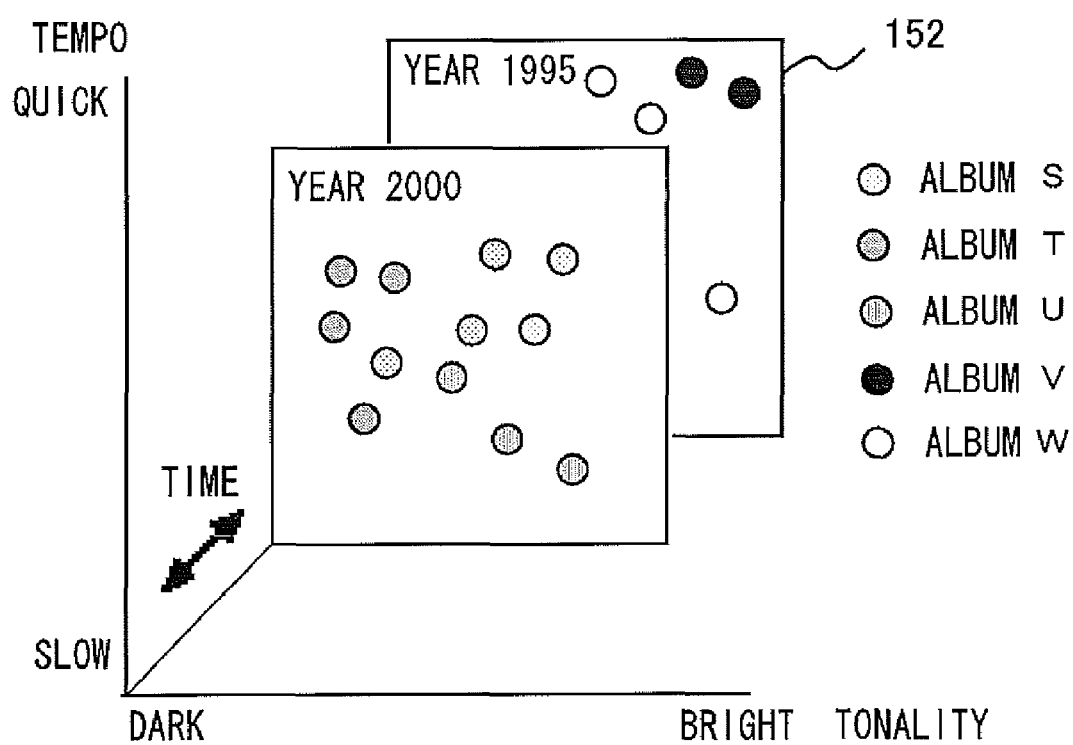
FIG. 16 shows an exemplary screen image displaying the distribution of characteristics of albums sorted by release year according to embodiment 2.

FIG. 16 shows an exemplary screen image displaying the distribution of characteristics of albums sorted by release year. The characteristic-quantity-distribution-displaying screen 150 displays a three-dimensional structure, where an age-segregated, two-dimensional map 152 is disposed in order of years. The age-segregated, two-dimensional map 152 is a map where the distribution of the characteristic quantity for a plurality of albums belonging to the same range of release year is displayed in a two-dimensional space. The age-segregated, two-dimensional map 152 may be a scatter diagram of two predetermined characteristic quantities among the characteristic quantities acquired by the characteristic quantity acquiring unit 14 or may be a scatter diagram where principal component analysis or factor analysis is performed on a certain characteristic quantity so that the characteristic quantity is consolidated into two parameters. In the example of FIG. 16, a value indicating the brightness of tunes (horizontal axis) and a value indicating the tempo (vertical axis) are adopted as the parameters of the scatter diagram, and the dots represent each tune.

In FIG. 16, two age-segregated, two-dimensional maps 152 are displayed, noted thereon "year 1995" and "year 2000," respectively. These maps correspond to albums released from 1995 to 1999 and albums released from 2000 to 2004, respectively. These age-segregated, two-dimensional maps 152 are displayed while a part of the maps overlap, as though the maps are disposed on the time axis in the depth direction. In order to implement such a display, the characteristic quantities acquired by the characteristic quantity acquiring unit 14 for the respective tunes included in an album are stored in advance in the analysis result storage 22. Additionally, the evaluation unit 26 reads out from the analysis result storage 22 the characteristic quantity of the tunes included in an album previously released by one performer whom the user specifies and inputs in the input unit 24.

Further, the bibliography information such as the release year of the album, or the like, is read out from the analysis result storage 22. Then the predetermined characteristic quantities are transformed into two values for each tune, as necessary, using the method described above. The output unit 28 draws, in the form of scatter diagram, the two values acquired in this manner on one of the age-segregated, two-dimensional maps 152, which is selected depending on the release year of the album. As shown in FIG. 16, different dot patterns may be used for the respective albums. Alternatively, the two values may be averaged, respectively, and one dot may represent one album, respectively. Further, when a user selects, using a pointing device, or the like, the age-segregated, two-dimensional map 152 displayed in the back, the map pointed by a user using input unit 24 may move forward or the front map may be displayed transparently so that all the age-segregated, two-dimensional maps 152 can be fully checked with ease.

In this manner, by representing the characteristic quantities for the respective tunes on a two dimensional scatter diagram and by disposing the maps for each range of release year, more information can be represented on one screen image. This makes it possible to search an album matching a combined condition while easily specifying a year-range. Further, by using scatter diagram for representation, the chronological transition of characteristics can be grasped viscerally. In the case that a dot represents a tune, it is possible to more accurately know the distribution of characteristic quantities for each album. In this case, when the user input for selecting one dot is executed, the selected tune may be replayed.

In FIG. 16, a two dimensional map is created for the respective ranges of release year, and time transition of the two dimensional map is represented by setting the time axis in the depth direction. However, the two dimensional map need not be created for a respective ranges of release year, and the time axis need not be set in the depth direction. For example, by creating a two dimensional map for each singer in similar manner and by setting an axis in depth direction for indicating singers, comparisons among singers are easily performed. The axis the in depth direction may be set to indicate classification according to the bibliography information, such as genre, or the like, or may be set to indicate characteristic quantities that are not represented on the two-dimensional map. Also in these cases, a similar advantage is obtained, such as that the user can grasp the transition of the characteristic viscerally.

According to the present embodiment described above, the characteristic quantities are assembled for each music tune assembly formed by using bibliography information, such as, album, singer, performer, genre, or the like, and the distributions of the characteristic quantities are utilized as information unique to the music tune assembly. Since the distribution information accurately reflects the characteristics of respective tunes, any comparison with other albums, singers, performers, or the like, can be performed with high precision. As a result, the relation between albums, or between singers or performers can be realized, which is hardly obtained by the bibliography information, and information on a new genre, singer, album, tune, or the like, can be provided based on the preference or requirement of a user.

Further, because the distribution information can be acquired automatically based on the characteristic quantity of the tune and simple bibliographic information, any updating requiring manpower can be suppressed to the minimum, and the cost in time and money can be restrained. In the present embodiment, respective tunes are classified and given values, based on a combination of a plurality of characteristic quantities, and the distribution information is acquired in the form of frequency for each class value. This makes it possible to evaluate the similarity among the music tune assemblies with a simple calculation where mainly natural numbers are calculated, thus making the computational load small. By recording class values in a database in advance, the computational load can be further suppressed at the stage when actually evaluating similarity, and, therefore, an accurate result can be obtained efficiently.

Since the distribution information is represented by a numerical value, the information can be easily converted into a figure. By displaying the information in a variety of forms, a user can understand the tendency of albums, or the like, intuitively. Therefore, it becomes possible to support a user who is selecting an album or a tune of a performer whose music the user has not much exposure to thus far. Further, since the characteristic quantity and class value are obtained for each tune, a plurality of pieces of information on different granularities, such as the information on an album, on a tune, or the like, can be related and displayed.

The description of the invention given above is based upon one illustrative embodiment. These embodiments described above are intended to be illustrative only, and it will be obvious to those skilled in the art that various modifications to constituting elements and processes could be developed and that such modifications are also within the scope of the present invention.

For example, according to the present embodiment, class values are given to respective tunes based on the combination of the characteristic quantities, and using the distribution of the frequency of the class values, the similarity among the music tune assemblies is evaluated. On the other hand, the class values may not be given, and the coordinates of the respective tunes in the space of the characteristic quantities, may be directly used. In this case, for example, tunes of which the Euclidean distance, calculated from the coordinates of a certain tune, is below a predetermined threshold value are assumed to belong to a same class. This allows the similarity between music tune assemblies to be accurately evaluated by similar processing as that of the present embodiment.

What is claimed is:

1. A music information processing apparatus comprising:
   a characteristic quantity acquiring unit operative to analyze a music tune and acquire a predetermined characteristic quantity,
   a bibliography information acquiring unit operative to acquire predetermined bibliography information of the music tune,
   a distribution acquiring unit operative to
   (a) form a music tune assembly in a predetermined unit, based on the bibliography information, and
   (b) acquire distribution information of an evaluation value, unique to a music tune and determined by a predetermined rule based on the characteristic quantity, for the music tune assembly, the distribution information including a frequency of existence of the characteristic quantity.

2. The music information processing apparatus according to claim 1, further comprising:
   a class value providing unit operative to
   (a) classify the music tune based on a combination of values of a plurality of types of characteristic quantities acquired by the characteristic quantity acquiring unit, and
   (b) provide class identification information for each music tune, wherein the distribution acquiring unit acquires information on distribution of the class identification information as information unique to the music tune assembly.

3. The music information processing apparatus according to claim 1, further comprising:
   an evaluation unit operative to
   (a) compare the evaluation value of a music tune specified by a user and the distribution information of a music tune assembly that does not include the music tune, and
   (b) evaluate the degree of correspondence between the music tune and the music tune assembly using a predetermined rule; and
   an output unit operative to provide, based on the evaluation by the evaluation unit, a user with information on a music tune assembly of which the degree of correspondence satisfies a predetermined condition.

4. The music information processing apparatus according to claim 1, further comprising:
   an evaluation unit operative to
   (a) compare the distribution information of a first music tune assembly based on specification by a user and the distribution information of a music tune assembly other than the first music tune assembly, and
   (b) evaluate the degree of correspondence between the assemblies using a predetermined rule, and
   an output unit operative to provide, based on the evaluation by the evaluation unit, a user with information on a second music tune assembly of which the degree of correspondence satisfies a predetermined condition.

5. The music information processing apparatus according to claim 4, wherein
   the evaluation unit evaluates a music tune assembly, including the tune specified by a user, as the first music tune assembly; and
   the output unit provides, based on the evaluation by the evaluation unit, information on the second music tune assembly that has the degree of correspondence greater than or equal to a predetermined threshold value as a recommended music tune assembly.

6. The music information processing apparatus according to claim 4, wherein
the evaluation unit compares the distribution information of a music tune assembly other than the first music tune assembly specified by the user and the distribution information of the first music tune assembly.

7. The music information processing apparatus according to claim 1, further comprising:
an evaluation unit operative to compare distribution information of a plurality of music tune assemblies specified by a user and to detect an evaluation value commonly included in the plurality of music tune assemblies; and
an output unit operative to extract a music tune having an evaluation value, satisfying a predetermined condition based on commonality, among the evaluation values detected by the evaluation unit and to provide information on the tunes.

8. The music information processing apparatus according to claim 1, further comprising:
an evaluation unit operative to extract a set of tunes having the same evaluation value as an evaluation value of a tune, which is included in the album specified by the user, one by one from a music tune assembly other than from the album; and
an output unit operative to reproduce the tunes extracted by the evaluation unit in order of the evaluation values that correspond to the order of tunes included in the album.

9. The music information processing apparatus according to claim 1, further comprising a displaying unit operative to list and display the distribution information of a plurality of music tune assemblies specified by a user by representing the frequency of each evaluation value by using the size of graphic symbols disposed for each of the music tune assemblies and for each of the evaluation values.

10. The music information processing apparatus according to claim 1, further comprising a displaying unit operative to represent an averaged value of predetermined characteristic quantity for each of a plurality of music tune assemblies specified by a user, as a graph for each of the music tune assemblies.

11. The music information processing apparatus according to claim 1, further comprising a displaying unit operative to calculate the evaluation value of a predetermined characteristic quantity for each of a plurality of music tune assemblies specified by a user, and operative to list and display the name of the a plurality of music tune assemblies in the order of the magnitude of the evaluation values.

12. The music information processing apparatus according to claim 1, further comprising a displaying unit operative to
(a) analyze a predetermined characteristic quantity of a plurality of music tune assemblies specified by a user, consolidate into a distribution having two parameters, and display on a two-dimensional map forming a plane,
(b) generate a plurality of two-dimensional maps for a third parameter, and
(c) display the maps while disposing in the depth direction so that a part of the maps overlap each other, wherein the displaying unit changes, accompanying the user's input for selecting the two-dimensional map, the disposition in the depth direction so that the entire two-dimensional map can be recognized.

13. A music distribution system including a server operative to distribute music to a user terminal manipulated by a user via a network, wherein the server comprises:
a characteristic quantity acquiring unit operative to analyze a music tune and acquire a predetermined characteristic quantity,
a bibliography information acquiring unit operative to acquire predetermined bibliography information of the music tune,
a distribution acquiring unit operative to
(a) form a music tune assembly in a predetermined unit, based on the bibliography information, and
(b) acquire a distribution information of an evaluation value, the value being unique to a music tune and determined by a predetermined rule based on the characteristic quantity, for the music tune assembly, the distribution information including a frequency of existence of the characteristic quantity,
an evaluation unit operative to detect, using the distribution information, a music tune assembly similar to a music tune assembly preferred by a user and specified through a user terminal, and
an output unit operative to transmit a music tune data included in the detected music tune assembly to a user terminal via a network.

14. A method for allowing a processor to generate information on music comprising:
reading out music tune data stored in a storage unit and acquiring a predetermined characteristic quantity by analyzing the music tune;
reading out predetermined bibliography information of the music tune stored in a storage unit;
forming a music tune assembly in a predetermined unit based on the bibliography information, and
acquiring distribution information of an evaluation value, the value being unique to a music tune and determined by a predetermined rule based on the characteristic quantity, for the music tune assembly, the distribution information including a frequency of existence of the characteristic quantity, and
storing the information, accordingly.

15. The method for allowing a processor to generate information on music according to claim 14 further comprising:
acquiring information on the preferred music tune from a user;
specifying a music tune assembly similar to the preferred music tune of the user by evaluating the similarity of distribution information on respective music tune assemblies, and
recommending the assembly to a user.

16. A non-transitory computer readable storage medium comprising:
a module that reads out music tune data stored in a storage unit and acquires a predetermined characteristic quantity by analyzing the music tune;
a module that reads out predetermined bibliography information of the music tune stored in a storage unit; and
a module that forms a music tune assembly in a predetermined unit based on the bibliography information and acquires distribution information of an evaluation value, the value being unique to a music tune and determined by a predetermined rule based on the characteristic quantity, for the music tune assembly, the distribution information including a frequency of existence of the characteristic quantity, and stores the information, accordingly.

* * * * *